United States Patent
Andou et al.

(10) Patent No.: US 9,781,945 B2
(45) Date of Patent: Oct. 10, 2017

(54) OIL-AND-FAT COMPOSITION AND OIL-IN-WATER TYPE EMULSION CONTAINING OIL-AND-FAT COMPOSITION

(75) Inventors: Masataka Andou, Kanagawa (JP); Yoriko Endo, Kanagawa (JP); Kiyomi Oonishi, Kanagawa (JP); Hirofumi Haruna, Kanagawa (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 1429 days.

(21) Appl. No.: 13/583,580

(22) PCT Filed: Feb. 23, 2011

(86) PCT No.: PCT/JP2011/054007
§ 371 (c)(1),
(2), (4) Date: Oct. 4, 2012

(87) PCT Pub. No.: WO2011/111527
PCT Pub. Date: Sep. 15, 2011

(65) Prior Publication Data
US 2013/0078354 A1    Mar. 28, 2013

(30) Foreign Application Priority Data

Mar. 12, 2010 (JP) .................. 2010-055378

(51) Int. Cl.
| | |
|---|---|
| A23D 9/007 | (2006.01) |
| A23L 1/00 | (2006.01) |
| A23D 7/00 | (2006.01) |
| A23L 29/10 | (2016.01) |
| A23L 9/20 | (2016.01) |

(52) U.S. Cl.
CPC ............ *A23L 1/0097* (2013.01); *A23D 7/003* (2013.01); *A23D 9/007* (2013.01); *A23L 9/20* (2016.08); *A23L 29/10* (2016.08)

(58) Field of Classification Search
CPC .................. A23D 7/003; A23D 9/007
See application file for complete search history.

(56) References Cited

U.S. PATENT DOCUMENTS 7,998,520 B2 * 8/2011 Oonishi ............... A23D 7/003
426/580

FOREIGN PATENT DOCUMENTS

| | | | |
|---|---|---|---|
| JP | 2006149229 A * | 6/2006 | .............. A23L 1/19 |
| JP | 2008-228610 A | 10/2008 | |
| JP | 2008-263790 A | 11/2008 | |
| JP | WO 2009130928 A1 * | 10/2009 | .............. A23D 7/003 |
| JP | 2010-022305 A | 2/2010 | |
| JP | 2010-220484 A | 10/2010 | |
| WO | WO 2009/025123 A1 | 2/2009 | |

OTHER PUBLICATIONS

Sahasranamam, "Coconut Oil and Palm Kernel Oil" (IOI Group, Loders Croklaan). Available online as of 2007 (no month) from www.soci.org. pp. 1-26.*
Machine translation of JP 2006/149229. Publication date Jun. 2006. pp. 1-4.*
International Search Report in PCT/JP2011/054007 dated May 17, 2011 (English Translation Thereof).
Japanese Office Action dated Mar. 24, 2015.

* cited by examiner

*Primary Examiner* — Jenna A Watts
(74) *Attorney, Agent, or Firm* — McGinn IP Law Group, PLLC

(57) ABSTRACT

Disclosed is a preferred oleaginous composition in an oil-in-water type emulsifier used as whipped cream mainly in confectionary and bread manufacturing. Use of the oleaginous composition suppresses whipped cream property changes that occur because of temperature changes, substantially without containing trans-fatty acid thereby providing an oil-in-water emulsifier with an excellent melt-in-the-mouth property. Disclosed is the manufacturing of an oil-in-water type emulsifier using an oleaginous composition containing a lauric acid content of 10-30% by weight and a triglyceride content of 30-55% by weight whose total carbon number is 44-48 of fatty-acid residue that composes the triglyceride, and containing a lauric-type oleo that contains interesterified fat with an iodine value of 30-50 and a lauric acid content of 40% by weight.

10 Claims, No Drawings

OIL-AND-FAT COMPOSITION AND OIL-IN-WATER TYPE EMULSION CONTAINING OIL-AND-FAT COMPOSITION

TECHNICAL FIELD

This invention relates to an oil-and-fat composition that is suitable for a starting material of an oil-in-water type emulsion mainly used as a whipped cream in the confectionery industry and the bread industry. By using the oil-and-fat composition, an oil-in-water type emulsion that is substantially free of trans-fatty acid, prevents properties change of the whipped cream due to temperature change, and has an excellent meltability in the mouth can be provided.

BACKGROUND ART

In Ministerial Ordinance Concerning Compositional Standards, etc. for Milk and Milk Products, cream is defined as a food configured such that an oil-and-fat contained in the cream has a milk fat content of 100% and there is no substitute for it in terms of good flavor and good meltability in the mouth. However, on the other hand, it has disadvantages that properties thereof are likely to be changed, it is solidified during transportation, the terminal width at the whipping is short so as to be difficult to deal with it, and further it is expensive.

At present, instead of a so-called raw cream having a milk fat content of 100%, for the purpose of utilizing the flavor and simultaneously improving workability, various types of whipped cream are available in the market, such as a type obtained by combining a milk fat and a vegetable fat with each other that is called as a compound cream, a type obtained by using only the vegetable fat that places a high value on a preserving property, a shape retaining property and a cost and that is called as a pure vegetable cream, and the like. The vegetable oil used for the starting material of the cheap pure vegetable cream has been mainly a hardened oil obtained by applying a hydrogenation process.

The hardened oil is a cheap and functional starting material, however, in recent years, it has been reported that a trans-fatty acid that occurs when hydrogenated is related to a disease such as a heart disease. In the United States and Europe, some countries take measures against it such as an obligation of labeling to food products with regard to the trans-fatty acid, and also in Japan, concerns therewith have been increased. Also, with regard to an oil-in-water type emulsion such as a whipped cream, it has been required not to use an hardened oil of a vegetable oil-and-fat containing the trans-fatty acid.

By the way, a laurin-based oil-and-fat such as coconut oil, palm kernel oil containing large amounts of a lauric acid that is a saturated fatty acid having the carbon number of 12 is known as a starting oil-and-fat material used for a whipped cream of a vegetable type called as a pure vegetable cream. The oil-in-water type emulsion obtained by using the laurin-based oil-and-fat has an extremely good meltability in the mouth, on the other hand, it has problems that emulsification is likely to be unstable, the terminal width at the whipping is short and the surface of cream whipped is likely to be roughened. Heretofore, in order to solve the problem of the laurin-based oil-and-fat, properties thereof have been improved by using a hardened oil of soybean oil, rapeseed oil or the like together. However, as mentioned above, a whipped cream that is free of trans-fatty acid has been required, thus instead of the hardened oil, a development of an oil-and-fat capable of utilizing the meltability in the mouth of the laurin-based oil-and-fat has been advanced.

As an oil-and-fat that is free of trans-fatty acid instead of a hardened oil, palm oil or a fractionated oil of palm oil is used. Palm oil maintains solid state at room temperature without hydrogenation, so that it can be used for food products in which solid fat is needed to be contained. However, palm oil has many disadvantages such that crystal grain coarsening is likely to be caused, and stability of a cream that contains the palm oil is reduced. In order to compensate for these disadvantages, a method of improving crystallinity of a palm-based oil-and-fat by applying transesterification thereto is known.

In Patent Literature 1, an oil-in-water type emulsion is disclosed, the emulsion including an oil-and-fat composition using a laurin-based oil-and-fat and a transesterified oil having a particular fatty acid composition together, being substantially free of trans-fatty acid, having a high emulsion stability, and having a good meltability in the mouth and whipping characteristics.

PRIOR ART DOCUMENTS

Patent Literature

Patent Literature 1: JP-2008-228610 A1

SUMMARY OF THE INVENTION

Problems to be Solved by the Invention

An oil-in-water type emulsion is required, that has better resistance characteristics to properties change caused by temperature change in comparison with the conventional oil-in-water type emulsion.

Accordingly, it is an object of the invention to provide an a whipped cream that is substantially free of trans-fatty acid, has resistance characteristics to properties change caused by temperature change, and has a good meltability in the mouth. It is the problem to be solved by the invention to develop an oil-and-fat composition that allows the above-mentioned whipped cream to be manufactured.

Means for Solving the Problems

The inventors et al. have been earnestly studied in order to solve the above-mentioned problem, as a result, it has been found that an oil-in-water type emulsion that is substantially free of trans-fatty acid, prevents properties change of the whipped cream due to temperature change, and has an excellent meltability in the mouth can be obtained by using an oil-and-fat composition configured such that a particular transesterified oil-and-fat containing a lauric acid and a laurin-based oil-and-fat containing large amounts of a lauric acid are combined with each other, so that the present invention has been completed. Further, the term "substantially free of trans-fatty acid" in the present invention means that the content of the trans-fatty acid is less than 5% by mass.

Namely, a first invention of the present invention is an oil-and-fat composition that includes 5 to 90% by mass of a transesterified oil-and-fat and 5 to 80% by mass of a laurin-based oil-and-fat, wherein the transesterified oil-and-fat is a transesterified oil-and-fat that comprises 10 to 30% by mass of a lauric acid in all the constituent fatty acids and 30 to 55% by mass of triglyceride configured such that the total carbon number of fatty acid residue constituting the triglyceride is 44 to 48, and has an iodine value of 30 to 50, and the laurin-based oil-and-fat is an oil-and-fat that comprises not less than 40% by mass of a lauric acid in all the constituent fatty acids.

A second invention of the present invention is the oil-and-fat composition according to the first invention of the present invention that further includes 5 to 40% by mass of a palm olein transesterified oil-and-fat obtained by that a palm fractionation soft portion having an iodine value of 55 to 75 is transesterified.

A third invention of the present invention is an oil-in-water type emulsion containing an oil-and-fat composition that includes the oil-and-fat composition according to the first or the second invention of the present invention, water and an emulsifier.

A fourth invention of the present invention is the oil-in-water type emulsion according to the third invention, wherein the oil content therein is more than 40% by mass.

A fifth invention of the present invention is the oil-in-water type emulsion according to the third or fourth invention that is a whipped cream.

A sixth invention of the present invention is a food product using the oil-in-water type emulsion according to any one of the third to the fifth invention of the present invention.

Advantages of the Invention

The oil-and-fat composition according to the present invention is used for an oil-in-water type emulsion that is mainly used as a whipped cream in the confectionery industry and the bread industry, thereby an oil-in-water type emulsion can be provided, that is substantially free of trans-fatty acid, prevents properties change of the whipped cream due to temperature change, and has an excellent meltability in the mouth.

The whipped cream using the oil-and-fat composition has resistance characteristics to properties change caused by temperature change, thus a phenomenon that a cream is increased in viscosity during transportation so as to be solidified, the phenomenon being called as "bote", can be prevented. In addition, the whipped cream after being foamed is excellent in a shape formative property and has a good meltability in the mouth that the laurin-based oil-and-fat has.

EMBODIMENT FOR CARRYING OUT THE INVENTION

The oil-and-fat composition according to the present invention includes a particular transesterified oil-and-fat and a laurin-based oil-and-fat containing large amounts of a laurie acid. A palm olein transesterified oil-and-fat can be further added to the oil-and-fat composition. Hereinafter, each of the oil-and-fats will be explained in order.

The transesterified oil-and-fat in the present invention is an oil-and-fat that is obtained by transesterifying a starting oil-and-fat material that includes 10 to 30% by mass of a lauric acid in all the constituent fatty acids, and has an iodine value of 30 to 50, and is an oil-and-fat that includes 30 to 55% by mass of triglyceride configured such that the total carbon number of fatty acid residue constituting the triglyceride is 44 to 48 after the transesterification. The transesterification reaction is not a reaction that changes the content of fatty acid in the oil-and-fat composition and the iodine value thereof, thus the transesterified oil-and-fat has the same content of lauric acid and the iodine value as the starting oil-and-fat material.

The lauric acid contained in the starting oil-and-fat material of the transesterified oil-and-fat is preferably 10 to 30% by mass, more preferably 15 to 30% by mass and the most preferably 18 to 25% by mass. In addition, the iodine value is preferably 30 to 50% by mass. It is more preferably 30 to 45% by mass and the most preferably 33 to 42% by mass.

As the starting oil-and-fat material of the transesterified oil-and-fat, any edible oil-and-fat can be used, if the content of the lauric acid and the iodine value thereof are included in the above-mentioned range. As the edible oil-and-fat, any processed oil-and-fat obtained by applying a process such as fractionation, hydrogenation, transesterification thereto can be also used. In case of using an oil-and-fat to which hydrogenation is applied, for the purpose of reducing trans-fatty acid, it is preferred to use an extremely hardened oil configured such that all of the double bonds are hydrogenated. In particular, a mixture of at least one of an oil-and-fat selected from an oil-and-fat containing a lauric acid such as coconut oil, palm kernel oil, babassu oil and a processed oil thereof, and at least one of an oil-and-fat selected from an oil-and-fat a vegetable oil-and-fat such as soybean oil, rapeseed oil, palm oil, shea butter, sal butter and a processed oil-and-fat thereof can be used. In particular, as the oil-and-fat containing a lauric acid, coconut oil and palm kernel oil are preferably used, and as the vegetable oil-and-fat, palm oil and palm fractionated oil are preferably used.

The transesterified oil-and-fat can be obtained by mixing the starting oil-and-fat materials, so as to be transesterified. After transesterification, the content of triglyceride configured such that the total carbon number of fatty acid residue constituting the triglyceride is 44 to 48 is preferably 30 to 55% by mass. It is more preferably 35 to 55% by mass and the most preferably 40 to 50% by mass. As the transesterification reaction for obtaining the transesterified oil-and-fat, any transesterification of a chemical transesterification and an enzymatic transesterification can be used.

In the chemical transesterification, the transesterification reaction is carried out by using a chemical catalyst such as sodium methoxide and the like as a catalyst. A transesterification reaction due to the chemical transesterification becomes a transesterification reaction that is poor in positional specificity (also referred to as a non-selective transesterification or a random transesterification).

The chemical transesterification reaction can be carried out, for example, in accordance with an ordinary method, by sufficiently drying the starting oil-and-fat materials, adding 0.1 to 1 mass % of catalyst to the starting oil-and-fat materials, and then stirring under reduced pressure, at 80 to 120 degrees C., for 0.5 to 1 hour. After completion of the transesterification reaction, decolorization treatment and deodorization treatment that are performed in a usual refinement process of edible oil can be carried out after the catalyst is washed off with water.

In the enzymatic transesterffication, the transesterification reaction carried out by using a lipase as a catalyst. As the lipase, a powdery lipase and an immobilized lipase configured such that the powdery lipase is fixed in a carrier such as Celite (Registered Trade Mark), an ion exchange resin can be used. The transesterification reaction due to the enzymatic transesterification can be carried out by any reaction of a transesterification reaction that is poor in positional specificity and a transesterification reaction that is high in 1,3-positional specificity in accordance with types of lipase.

The lipase capable of carrying out the transesterification reaction that is poor in positional specificity includes a lipase derived from the genus *Alcaligenes* (for example, "Lipase (ALM", "Lipase PL" and the like manufactured by Meito Sangyo Co., Ltd.), a lipase derived from the genus *Candida* (for example, "Lipase OF" manufactured by Meito Sangyo Co., Ltd.) and the like.

The lipase capable of carrying out the transesterification reaction that is high in 1,3-positional specificity includes an immobilized lipase derived from the *Rhizomucor miehei* ("Lipozyme TLIM" and "Lipozyme RMIM" and the like manufactured by Novozymes A/S) and the like.

The enzymatic transesterification reaction can be carried out, for example, by adding 0.02 to 10 mass %, preferably, 0.04 to 5 mass % of the powdery lipase or the immobilized lipase to the starting oil-and-fat materials, and then stirring at 40 to 80 degrees C., preferably 40 to 70 degrees C., for 0.5 to 48 hours, preferably 0.5 to 24 hours. After completion of the transesterification reaction, decolorization treatment and deodorization treatment that are performed in a usual refinement process of edible oil can be carried out after the powdery lipase or the immobilized lipase is removed by filtration or the like.

The laurin-based oil-and-fat according to the present invention means an oil-and-fat that contains not less than 40% by mass of a lauric acid that is a saturated fatty acid having a carbon number of 12 in all the constituent fatty acids.

It is preferred to use separately or in combination one or not less than two selected from coconut oil, palm kernel oil, and fractionated oil, extremely hardened oil, and transesterified oil thereof. A vegetable oil-and-fat and a processed oil-and-fat thereof other than the oil-and-fat derived from coconut oil and palm kernel oil can be mixed with each other, if the lauric acid is contained in the range of not less than 40% by mass. In case of using a hydrogenated hardened oil as the vegetable oil-and-fat to be mixed, for the purpose of allowing trans-fatty acid not to be present, it is preferred to use an extremely hardened oil configured such that all of is the double bonds are hydrogenated.

The palm olein transesterified oil-and-fat according to the present invention means an oil-and-fat that is obtained by transesterifying a palm fractionation soft oil obtained by applying a fractionation treatment (natural fractionation, solvent fractionation, surfactant fractionation and the like) to palm oil. As the palm fractionation soft oil, a palm olein obtained by fractionating palm oil in the first stage, and a super olein obtained by further fractionating the palm olein can be used. As the transesterification reaction for obtaining the palm olein transesterified oil-and-fat, any transesterification of a chemical transesterification and an enzymatic transesterification can be used, and it can be manufactured by the same manufacturing method as that of the above-mentioned transesterified oil-and-fat. The iodine value of the palm olein transesterified oil-and-fat is preferably 55 to 75 and more preferably 55 to 68.

In case of obtaining the oil-and-fat composition according to the present invention by blending the transesterified oil-and-fat and the laurin-based oil-and-fat, the transesterified oil-and-fat is contained preferably in an amount of 5 to 90% by mass in the oil-and-fat composition. It is contained more preferably in an amount of 10 to 55% by mass, and the most preferably in an amount of 10 to 50% by mass. If the transesterified oil-and-fat is included in the above-mentioned range, a whipped cream that is an oil-in-water type emulsion obtained by using the oil-and-fat composition according to the present invention has resistance characteristics to properties change caused by temperature change, and can prevent the phenomenon that a cream is increased in viscosity during transportation so as to be solidified, the phenomenon being called as "bote".

The laurin-based oil-and-fat is contained preferably in an amount of 5 to 80% by mass in the oil-and-fat composition. It is contained more preferably in an amount of 20 to 80% by mass, and the most preferably in an amount of 50 to 80% by mass. The laurin-based oil-and-fat has a feeling of coolness that is peculiar to the laurin-based oil-and-fat, thus due to blending the laurin-based oil-and-fat, the whipped cream that is the oil-in-water type emulsion according to the present invention becomes an oil-and-fat that has a feeling of coolness and a good meltability in the mouth.

The oil-and-fat composition according to the present invention can be configured to further include a palm olein transesterified oil-and-fat other than the transesterified oil-and-fat and the laurin-based oil-and-fat.

In case of blending the above-mentioned three oil-and-fats, the transesterified oil-and-fat is contained preferably in an amount of 5 to 50% by mass in the oil-and-fat composition. It is contained more preferably in an amount of 10 to 40% by mass, and the most preferably in an amount of 10 to 30% by mass.

The laurin-based oil-and-fat is contained preferably in an amount of 20 to 80% by mass in the oil-and-fat composition. It is contained more preferably in an amount of 30 to 70% by mass, and the most preferably in an amount of 40 to 60% by mass.

The palm olein transesterified oil-and-fat is contained preferably in an amount of 5 to 40% by mass in the oil-and-fat composition. It is contained more preferably in an amount of 10 to 40% by mass, and the most preferably in an amount of 10 to 30% by mass. If the palm olein transesterified oil-and-fat is included in the above-mentioned range, the whipped cream that is the oil-in-water type emulsion according to the present invention becomes a cream that has a finer texture and a further excellent shape formative property.

The oil-and-fat composition according to the present invention can include another vegetable oil-and-fats other than the above-mentioned transesterified laurin-based oil-and-fat and palm olein transesterified oil-and-fat. For example, the another vegetable oil-and-fats include various vegetable oil-and-fats such as soybean oil, rapeseed oil, sunflower oil, safflower oil, rice oil, cotton seed oil, corn oil, olive oil, palm oil, palm kernel oil, coconut oil, cacao butter, shea butter, sal butter, mango kernel oil, illipe butter, and various processed oil-and-fats obtained by applying a processing such as hydrogenation, transesterification, fractionation to one or not less than two of vegetable oil-and-fats selected from the above-mentioned various vegetable oil-and-fats according to the need. One or not less than two of oil-and-fats selected from the various vegetable oil-and-fats and the various processed oil-and-fats can be appropriately blended. In case of carrying out hydrogenation, it is preferred to use an extremely hardened oil configured such that all of the double bonds in which trans-fatty acid is not present are hydrogenated.

In case of adding the another vegetable oil-and-fat to the oil-and-fat composition according to the present invention, the another vegetable oil-and-fat is contained preferably in an amount of 1 to 30% by mass in the oil-and-fat composition. It is contained more preferably in an amount of 1 to 25% by mass, and the most preferably in an amount of 1 to 20% by mass.

Normally, the oil-and-fat composition according to the present invention does not include any ingredient other than oil-and-fat, but a little amount of ingredient other than oil-and-fat can be included, insofar as the advantages of the present invention are not vitiated. The ingredient other than oil-and-fat is preferably an oil-soluble ingredient that is soluble in oil-and-fat, for example, it includes an emulsifier, an antioxidant agent, a perfume material and the like. The additives are contained preferably in an amount of less than 5% by mass, more preferably in an amount of less than 3% by mass, and the most preferably in an amount of less than 1% by mass in the oil-and-fat composition.

The oil-and-fat composition according to the present invention can be used for an oil-in-water, type emulsion. In particular, it can be preferably used for a whipped cream that includes both of a cream for a whipped cream before foaming and a whipped cream after foaming.

The oil-in-water type emulsion according to the present invention is characterized by including the oil-and-fat composition according to the present invention, water and an emulsifier. The oil-in-water type emulsion according to the present invention can include only the oil-and-fat composition according to the present invention, and can also include a milk fat as an oil-and-fat other than the oil-and-fat composition according to the present invention.

In case of including the milk fat in the oil-and-fat composition according to the present invention, the content of the oil-and-fat composition is preferably 50 to 99% by mass, and more preferably 60 to 99% by mass in the total amount of the milk fat and the oil-and-fat composition according to the present invention. The content of the milk fat is preferably 1 to 50% by mass, and more preferably 1 to 40% by mass.

As the emulsifier used in the oil-in-water type emulsion according to the present invention, for example, a conventionally known emulsifier such as lecithin, glycerin fatty acid ester, sucrose fatty acid ester, propylene glycol fatty acid ester, sorbitan fatty acid ester, polyglyceryl fatty acid ester, organic acid fatty acid ester, polysorbate can be used. The content of the emulsifier is preferably 0.1 to 5% by mass in the oil-in-water type emulsion. It is more preferably 0.1 to 3% by mass and the most preferably 0.1 to 2% by mass.

In the oil-in-water type emulsion according to the present invention, as an ingredient other than the oil-and-fat composition, water and the emulsifier, ingredients such as non fat milk solid, whole powdered milk, milk product, sugar group, stabilizer, salt group, perfume material that are usually blended in an oil-in-water type emulsion can be appropriately blended.

As the non fat milk solid, for example, powdered skim milk, whey powder, casein sodium and the like can be used. The non fat milk solid that is partially replaced with vegetable protein can be also used. The content of the non fat milk solid is preferably 0.1 to 10% by mass in the oil-in-water type emulsion. It is more preferably 0.1 to 8% by mass and the most preferably 0.1 to 6% by mass.

As the sugar group, for example, glucose, maltose, sorbitol, sucrose, lactose and the like can be used.

As the stabilizer, for example, gellan gum, carrageenan, starch, xanthane gum, guar gum, and the like can be used.

As the salt group, for example, sodium metaphosphate, phosphoric acid alkali metal salt, citric acid alkali metal salt, and the like can be used.

The above-mentioned other ingredients can be included in the oil-in-water type emulsion within the range that does not vitiate the function thereof.

In the oil-in-water type emulsion according to the present invention, both of a high oil content composition configured such that the oil content is more than 40% by mass and a low oil content composition can be adopted. The oil content in the present invention means the total content of an oil-and-fat and an oil-soluble ingredient that is soluble in the oil-and-fat. In the oil-in-water type emulsion according to the present invention, the oil content is preferably 20 to 50% by mass, more preferably 30 to 50% by mass, and the most preferably more than 40% by mass and not more than 50% by mass.

Namely, the oil-in-water type emulsion according to the present invention that has a high oil content composition configured such that the oil content is more than 40% by mass can realize a whipped cream that is increased in richness and enhanced in eating quality.

A manufacturing method of the oil-in-water type emulsion according to the present invention is not particularly limited, a conventionally known manufacturing method can be adopted. For example, after an oil phase including the oil-and-fat composition according to the present invention and a water phase are respectively prepared, both phases are mixed with each other, and the emulsion obtained is subjected to a homogenization treatment, so as to manufacture the oil-in-water type emulsion. In addition, according to the need, it can be also subjected to a sterilization treatment. As the homogenization treatment, any of a prior homogenization configured such that the homogenization treatment is carried out before the sterilization treatment and a post homogenization configured such that the homogenization treatment is carried out after the sterilization treatment can be adopted, in addition, a two-stage homogenization configured such that both of the prior homogenization and the post homogenization are combined can be also adopted. It is preferable that a cooling process and an aging step process are carried out after the homogenization treatment.

In case of allowing a milk fat to be contained in the oil-in-water type emulsion according to the present invention, an oil phase containing a milk fat is prepared by adding the milk fat to the oil-and-fat composition according to the present invention, and then the oil phase is combined with a water phase so as to be emulsified, thereby it can be manufactured. In addition, a raw cream that means a cream manufactured from only the milk fat is blended into a water phase, and further the water phase obtained and an oil phase containing the oil-and-fat composition according to the present invention are emulsified, thereby it can be also manufactured. Furthermore, an oil-in-water type emulsion manufactured by using the oil-and-fat composition according to the present invention is mixed with a raw cream, thereby it can be also manufactured.

The oil-in-water type emulsion according to the present invention can be preferably used for a whipped cream that includes both of a cream for a whipped cream before foaming and a whipped cream after foaming. The whipped cream can be preferably used for a food product in the confectionery industry and the bread industry such as cake, bread.

In addition, the food product using the oil-in-water type emulsion according to the present invention means a food product manufactured by using the oil-in-water type emulsion according to the present invention. For example, if the oil-in-water type emulsion is a cream, it can be preferably used for cake, bread and the like as a whipped cream, and further it can be also preferably used for white sauce, cream sauce and the like without being foamed as a cream for cooking. Furthermore, it can be used for manufacturing a new food product by mixing with the other vegetable cream and the raw cream that means a cream manufactured from only the milk fat.

EXAMPLES

Next, the present invention will be explained by Examples. However, the present invention is not particularly limited to these Examples. Further, all percentages (%) described below mean a percentage (%) by mass.

The composition of the oil-and-fat compositions 1 to 14 and the content of trans-fatty acid were shown in Tables 1 to 4. The oil-and-fat compositions 1 to 14 correspond to Examples 1 to 9 and Comparative Examples 1 to 5.

In addition, oil-in-water type emulsions (creams) having compositions shown in Table 5 and the oil content of approximately 45%, and capable of being whipped were obtained by using the oil-and-fat compositions 1 to 14. The respective creams using the oil-and-fat compositions 1 to 14 correspond to Examples 10 to 18 and Comparative Examples 6 to 10. The evaluation results of the oil-in-water type emulsions (creams) were described in Tables 6 to 9.

(Preparation of Oil-and-fat Composition)

Starting oil-and-fat materials shown in Tables 1 to 4 were melted and the respective requisite amounts were weighed on a scale so as to be blended, and then propeller stirring was carried out for 30 minutes in a state of keeping 60 degrees C., so as to manufacture oil-and-fat compositions in a uniform state.

As the starting oil-and-fat materials shown in Tables 1 to 4, the following were used.

[Starting Oil-and-fat Material of Transesterified Oil-and-fat A1]

A mixture product including 40% of palm kernel oil and 60% of palm oil (manufactured by the Nissin OilliO Group, Ltd.) was used. The content of lauric acid and the like and the iodine value were as follows.

Content of lauric acid: 18.8%
Content of triglyceride configured such that the total carbon number of fatty acid residue constituting the triglyceride is 44 to 48: 13.2%
Iodine value: 37
Content of trans-fatty acid: 0%

[Transesterified Oil-and-fat A1]

As the transesterified oil-and-fat A1, an oil-and-fat (manufactured by the Nissin OilliO Group, Ltd.) that is obtained by transesterifying the above-mentioned starting oil-and-fat material of the oil-and-fat A1 (a mixture product including 40% of palm kernel oil and 60% of palm oil) was used. The content of lauric acid and the like and the iodine value were as follows.

Content of lauric acid: 18.8%
Content of triglyceride configured such that the total carbon number of fatty acid residue constituting the triglyceride is 44 to 48: 44.1%
Iodine value: 37
Content of trans-fatty acid: 0%

[Transesterified Oil-and-fat A2]

As the transesterified oil-and-fat A2, an oil-and-fat (manufactured by the Nissin OilliO Group, Ltd.) that is obtained by transesterifying a mixture product including 30% of palm oil, 30% of palm stearin and 40% of palm kernel olein was used. The content of lauric acid and the like and the iodine value were as follows.

Content of lauric acid: 16.4%
Content of triglyceride configured such that the total carbon number of fatty acid residue constituting the triglyceride is 44 to 48: 44.5%
Iodine value: 32
Content of trans-fatty acid: 0%

[Laurin-Based Oil-and-fat]

As the laurin-based oil-and-fat, a coconut extremely hardened oil (sold under a trade name of "Coconut hard 34" and manufactured by the Nissin OilliO Group, Ltd.) was used. The content of lauric acid and trans-fatty acid was as follows.

Content of lauric acid: 45.6%
Content of trans-fatty acid: 0%

[Palm Olein Transesterified Oil-and-fat]

As the palm olein transesterified oil-and-fat, an oil-and-fat that is obtained by transesterifying a palm fractionation soft portion having the iodine value of 56 (manufactured by the Nissin OilliO Group, Ltd.) was used. The content of lauric acid and the iodine value were as follows.

Iodine value: 56
Content of trans-fatty acid: 1.4%

[Palm Medium-melting Portion]

As the palm medium-melting portion, a palm fractionation medium-melting portion (manufactured by INTERCONTINENTAL SPECIALTY FATS SDN. BHD.). The content of lauric acid and the iodine value were as follows.

Iodine value: 45
Content of trans-fatty acid: 0.5%

[Palm Oil]

As the palm oil, a palm oil (sold under a trade name of "Refined palm oil" and manufactured by the Nissin OilliO Group, Ltd.) was used. The content of lauric acid and the iodine value were as follows.

Iodine value: 53
Content of trans-fatty acid: 0.6%

(Manufacturing Method of Transesterified Oil-and-fats A1 and A2 and Palm Olein Transesterified Oil-and-fat)

Starting oil-and-fat materials were heated under reduced pressure to 120 degrees C. so as to be sufficiently dried, and then 0.2% by mass of sodiummethylate relative to the oil-and-fats was added thereto, and a transesterification reaction was carried out under reduced pressure at 110 degrees C. for 0.5 hour while stirring. After completion of the transesterification reaction, the sodiummethylate was washed off with water, and in accordance with a usual refinement process, decolorization treatment and deodorization treatment were carried out, so as to obtain transesterified oil-and-fats. Further, the fatty acid composition in the starting oil-and-fat material of the oil-and-fat composition was measured by a gas chromatography method in accordance with AOCS Celf-96.

TABLE 1

| Table 1 Composition of oil-and-fat composition (%) | | | | |
|---|---|---|---|---|
| Oil-and-fat composition | 1 Co Ex 1 | 2 Example 1 | 3 Example 2 | 4 Example 3 |
| Transesterified oil-and-fat A1 | 100 | 90 | 80 | 70 |
| Starting oil-and-fat material of transesterified oil-and-fat A1 | — | — | — | — |
| Transesterified oil-and-fat A2 | — | — | — | — |
| Laurin-based oil-and-fat | — | 10 | 20 | 30 |
| Palm olein transesterified oil-and-fat | — | — | — | — |
| Palm medium-melting portion | — | — | — | — |
| Palm oil | — | — | — | — |
| Total | 100 | 100 | 100 | 100 |
| Trans-fatty acid | 0 | 0 | 0 | 0 |

Co Ex 1: Comparative Example 1

TABLE 2

Table 2
Composition of oil-and-fat composition (%)

| Oil-and-fat composition | 5<br>Example 4 | 6<br>Example 5 | 7<br>Example 6 |
|---|---|---|---|
| Transesterified oil-and-fat A1 | 50 | 40 | 20 |
| Starting oil-and-fat material of transesterified oil-and-fat A1 | — | — | — |
| Transesterified oil-and-fat A2 | — | — | — |
| Laurin-based oil-and-fat | 50 | 60 | 80 |
| Palm olein transesterified oil-and-fat | — | — | — |
| Palm medium-melting portion | — | — | — |
| Palm oil | — | — | — |
| Total | 100 | 100 | 100 |
| Trans-fatty acid | 0 | 0 | 0 |

TABLE 3

Table 3
Composition of oil-and-fat composition (%)

| Oil-and-fat composition | 8<br>Co Ex 2 | 9<br>Co Ex 3 | 10<br>Co Ex 4 | 11<br>Co Ex 5 |
|---|---|---|---|---|
| Transesterified oil-and-fat A1 | — | — | — | — |
| Starting oil-and-fat material of transesterified oil-and-fat A1 | — | — | — | 50 |
| Transesterified oil-and-fat A2 | — | — | — | — |
| Laurin-based oil-and-fat | 100 | 70 | 80 | 50 |
| Palm olein transesterified oil-and-fat | — | — | — | — |
| Palm medium-melting portion | — | 30 | — | — |
| Palm oil | — | — | 20 | — |
| Total | 100 | 100 | 100 | 100 |
| Trans-fatty acid | 0 | 0.2 | 0.1 | 0 |

Co Ex 1 to Co Ex 5: Comparative Example 1 to Comparative Example 5

TABLE 4

Table 4
Composition of oil-and-fat composition (%)

| Oil-and-fat composition | 12<br>Example 7 | 13<br>Example 8 | 14<br>Example 9 |
|---|---|---|---|
| Transesterified oil-and-fat A1 | 30 | 10 | — |
| Starting oil-and-fat material of transesterified oil-and-fat A1 | — | — | — |
| Transesterified oil-and-fat A2 | — | — | 50 |
| Laurin-based oil-and-fat | 60 | 60 | 50 |
| Palm olein transesterified oil-and-fat | 10 | 30 | — |
| Palm medium-melting portion | — | — | — |
| Palm oil | — | — | — |
| Total | 100 | 100 | 100 |
| Trans-fatty acid | 0.1 | 0.4 | 0 |

TABLE 5

Table 5
Composition of oil-in-water type emulsion (Cream) (%)

| | |
|---|---|
| Oil-and-fat composition 1 to 14 | 44.5 |
| Emulsifier | 0.5 |
| Perfume material | 0.1 |
| Powdered skim milk | 4.5 |
| Sodium metaphosphate | 0.1 |
| Water | 50.3 |
| Total | 100 |

(Preparation of Oil-in-Water Type Emulsion (Cream))

An emulsifier (0.25% by mass of soybean lecithin, 0.0625% by mass of glycerin fatty acid ester and 0.0625% by mass of sorbitan fatty acid ester) and a perfume material were dissolved and dispersed in an oil-and-fat composition, so as to prepare an oil phase. At the same time, powdered skim milk, sodium metaphosphate, and an emulsifier (0.125% by mass of sucrose fatty acid ester) were dissolved and dispersed in water, so as to prepare a water phase. Next, the oil phase was added to the water phase, and a preliminary emulsification was carried out by a homomixer while adjusting a temperature to 60 to 70 degrees C. After the preliminary emulsification, homogenization was carried out under a pressure of 6.0 MPa, batch sterilization was carried out at 85 degrees C. for 15 minutes and cooling was carried out to approximately 10 degrees C., and then aging was carried out in a refrigerator of 5 degrees C. for approximately 18 hours.

(Evaluation Method of Oil-in-water Type Emulsion (Cream))

With regard to emulsification stability, viscosity, heat shock, whipping time, shape formative property, meltability in the mouth and texture of the oil-in-water type emulsions (creams) of Examples 10 to 18 and Comparative Examples 6 to 10, evaluations were carried out as follows.

[Emulsification Stability]

Each of the creams is weighed by 60 g in a beaker of 100 ml, the temperature thereof is adjusted at 20 degrees C., and it is rotated at 160 rpm by a three-one motor having a propeller of four blades, and then the elapsed time until the cream is increased in viscosity and solidified is measured. It is shown that the longer the elapsed time until the cream is increased in viscosity and solidified is, the higher the emulsification stability is. It is preferable that the elapsed time until the increase in viscosity and solidification is more than 5 minutes.

[Viscosity]

Each of the creams is weighed by 200 g in a beaker of 200 ml, and the temperature thereof is adjusted at 10 degrees C. Viscosity is measured by a B-type viscometer (rotor No. 2, 60 rpm). It is preferable that the viscosity is not more than 200 mPa·s.

[Heat Shock]

Each of the creams is weighed by 200 g in a beaker of 200 ml, and it is left in each of constant temperature baths of 20 and 25 degrees C. for 4 hours. After that, it is moved to a refrigerator (temperature inside is 5 to 10 degrees C.), after being left overnight, the temperature is adjusted to 10 degrees C., and the viscosity is measured by a B-type viscometer (rotor No. 2, 60 rpm). It is shown that the less the increase of viscosity is, the higher the thermal stability is. It is preferable that the increase of viscosity is not more than 2 times of the initial viscosity in case of keeping at 20 degrees C., and is not more than 3 times of the initial viscosity in case of keeping at 25 degrees C.

[Whipping Time]

To 500 g of each of the creams, 35 g of sugar are added, it is whipped by using a Hobart mixer manufactured by HOBART JAPAN at a medium speed (level 2: approximately 120 rpm), and then the elapsed time until the cream becomes such a condition that the cream has a hardness suitable for piping due to the whipping, the condition being called as "jyubudate" is measured. It is preferable that the whipping time is included in the range of 4 to 6 minutes.

[Shape Formative Property]

The cream whipped in the condition of "jyubudate", namely in the condition of having a hardness suitable for piping, is piped via a star-shaped mouth ring, and the condition thereof is observed, and then a five-grade evaluation of A to D described below is carried out. The flower formative property is judged as an acceptable level that can endure a practical use, if the condition is included in the grade of A to B. It is more preferable that the condition is included in the grade A and A−.

A: Appearance is smooth and edge is sharp.
A−: Appearance is somewhat wet and edge is slightly round.
B: Appearance is somewhat dry and edge is sharp.
C: Appearance is wet and edge has a deformed part.
D: Appearance is dry and cream is tightened so as to be hard.

[Meltability in the Mouth and Texture]

The meltability in the mouth and the texture of the cream whipped in the condition of "jyubudate", namely in the condition of having a hardness suitable for piping, are evaluated by a five-grade sensory evaluation of A to D described below. The meltability in the mouth and the texture are judged as an acceptable level based on a preferable feeling, if the condition is included in the grade of A to B. It is more preferable that the condition is included in the grade A.

A: Cream has an appropriate hardness, a sharp melting feeling in the mouth, and a clean finish since remainder is not left behind.
A−: Cream has an appropriate hardness and a melting feeling in the mouth, and remainder is not left behind.
B: Cream is soft and slowly melted in the mouth, and remainder is not left behind.
C: Cream is soft, and has a feeling that remainder is haltingly left in the mouth.
D: Cream is hard, and has a feeling that oil-and-fat is left after being melted in the mouth.

TABLE 6

Table 6
Evaluation result of oil-in-water type emulsion (Cream)

|  | Co Ex 6 | Example 10 | Example 11 | Example 12 |
|---|---|---|---|---|
| Oil-and-fat composition used | 1 | 2 | 3 | 4 |
| Trans-fatty acid (%) | 0 | 0 | 0 | 0 |
| Emulsification stability | NLT10 min | NLT10 min | NLT10 min | NLT10 min |
| Viscosity (mPa · s) | 102 | 90 | 98 | 120 |
| Heat shock 20 degrees C. (mPa · s) | 128 | 120 | 118 | 210 |
| 20 degrees C. Viscosity increase ratio | 1.3 | 1.3 | 1.2 | 1.8 |
| Heat shock 25 degrees C. (mPa · s) | 157 | 155 | 128 | 265 |
| 25 degrees C. Viscosity increase ratio | 1.5 | 1.7 | 1.3 | 2.2 |
| Whipping time | 6 min 40 sec | 5 min 21 sec | 4 min 58 sec | 4 min 50 sec |
| Shape formative property | C | A− | A− | A− |
| Meltability in the mouth and Texture | C | B | B | A− |

Co Ex 6: Comparative Example 6
NLT10 min: Not less than 10 minutes
6 min 40 sec: 6 minutes and 40 seconds

TABLE 7

Table 7
Evaluation result of oil-in-water type emulsion (Cream)

|  | Example 13 | Example 14 | Example 15 |
|---|---|---|---|
| Oil-and-fat composition used | 5 | 6 | 7 |
| Trans-fatty acid (%) | 0 | 0 | 0 |
| Emulsification stability | 8 min 00 sec | 5 min 11 sec | 5 min 00 sec |
| Viscosity (mPa · s) | 90 | 108 | 130 |
| Heat shock 20 degrees C. (mPa · s) | 115 | 140 | 190 |
| 20 degrees C. Viscosity increase ratio | 1.3 | 1.3 | 1.5 |
| Heat shock 25 degrees C. (mPa · s) | 130 | 255 | 380 |
| 25 degrees C. Viscosity increase ratio | 1.4 | 2.4 | 2.9 |
| Whipping time | 4 min 44 sec | 4 min 41 sec | 5 min 10 sec |
| Shape formative property | A | B | B |
| Meltability in the mouth and Texture | A | A | A |

8 min 00 sec: 8 minutes and 00 seconds

TABLE 8

Table 8
Evaluation result of oil-in-water type emulsion (Cream)

|  | Co Ex 7 | Co Ex 8 | Co Ex 9 | Co Ex 10 |
|---|---|---|---|---|
| Oil-and-fat composition used | 8 | 9 | 10 | 114 |
| Trans-fatty acid (%) | 0 | 0.1 | 0.1 | 0 |
| Emulsification stability | 0 min 50 sec | 0 min 10 sec | 2 min 20 sec | 2 min 12 sec |
| Viscosity (mPa · s) | 118 | 220 | 90 | 193 |
| Heat shock 20 degrees C. (mPa · s) | 240 | NLT500 | 350 | NLT500 |
| 20 degrees C. Viscosity increase ratio | 2.0 | — | 3.6 | — |
| Heat shock 25 degrees C. (mPa · s) | NLT500 | NLT500 | NLT500 | NLT500 |
| 25 degrees C. Viscosity increase ratio | — | — | — | — |
| Whipping time | 5 min 21 sec | 1 min 28 sec | 7 min 43 sec | 2 min 52 sec |
| Shape formative property | D | D | D | A |
| Meltability in the mouth and Texture | A | A− | A− | A |

Co Ex 7 to Co Ex 10: Comparative Example 7 to Comparative Example 10
0 min 50 sec: 0 minutes and 50 seconds
NLT500: Not less than 500

TABLE 9

Table 9
Evaluation result of oil-in-water type emulsion (Cream)

|  | Example 16 | Example 17 | Example 18 |
|---|---|---|---|
| Oil-and-fat composition used | 12 | 13 | 14 |
| Trans-fatty acid (%) | 0.1 | 0.2 | 0 |
| Emulsification stability | 8 min 06 sec | 7 min 00 sec | 7 min 24 sec |
| Viscosity (mPa · s) | 83 | 93 | 90 |
| Heat shock 20 degrees C. (mPa · s) | 115 | 130 | 120 |
| 20 degrees C Viscosity increase ratio | 1.4 | 1.4 | 1.4 |
| Heat shock 25 degrees C. (mPa · s) | 200 | 163 | 150 |

TABLE 9-continued

Table 9
Evaluation result of oil-in-water type emulsion (Cream)

| | Example 16 | Example 17 | Example 18 |
|---|---|---|---|
| 25 degrees C Viscosity increase ratio | 2.4 | 1.8 | 2.4 |
| Whipping time | 5 min 37 sec | 4 min 17 sec | 4 min 14 sec |
| Shape formative property | A | A− | B |
| Meltability in the mouth and Texture | A | A | A− |

8 min 06 sec: 8 minutes and 06 seconds

What is claimed is:

1. An oil-and-fat composition, comprising:
   80% to 90% by mass of a transesterified oil-and-fat; and
   5% to 20% by mass of a laurin-based oil-and fat,
   wherein the transesterified oil-and-fat is a transesterified oil-and-fat that comprises 10% to 25% by mass of a lauric acid in all constituent fatty acids and 30% to 55% by mass of triglyceride configured such that a total carbon number of fatty acid residue constituting the triglyceride is 44 to 48, and has an iodine value of 30 to 50, and
   wherein the laurin-based oil-and-fat is an oil-and-fat that comprises not less than 40% by mass of a lauric acid in all the constituent fatty acids.

2. An oil-and-fat composition, comprising:
   5% to 90% by mass of a transesterified oil-and-fat;
   5% to 80% by mass of a laurin-based oil-and-fat; and
   5% to 40% by mass of a palm olein transesterified oil-and-fat obtained by that a palm fractionation soft portion having an iodine value of 55 to 75 is transesterified,
   wherein the transesterified oil-and-fat is a transesterified oil-and-fat that comprises 10% to 25% by mass of a lauric acid in all constituent fatty acids and 30% to 55% by mass of triglyceride configured such that a total carbon number of a fatty acid residue constituting the triglyceride is 44 to 48, and has an iodine value of 30 to 50, and
   wherein the laurin-based oil-and-fat is an oil-and-fat that comprises not less than 40% by mass of a lauric acid in all the constituent fatty acids.

3. An oil-in-water type emulsion containing an oil-and-fat composition, comprising:
   the oil-and-fat composition according to claim 1;
   water; and
   an emulsifier.

4. An oil-in-water type emulsion containing an oil-and-fat composition, comprising:
   the oil-and-fat composition according to claim 2;
   water; and
   an emulsifier.

5. The oil-in-water type emulsion according to claim 3, wherein an oil content therein is more than 40% by mass.

6. The oil-in-water type emulsion according to claim 4, wherein an oil content therein is more than 40% by mass.

7. The oil-in-water emulsion according to claim 3 that is a whipped cream.

8. The oil-in-water type emulsion according to claim 4 that is a whipped cream.

9. The oil-in-water type emulsion according to claim 5 that is a whipped cream.

10. The oil-in-water type emulsion according to claim 6 that is a whipped cream.

* * * * *